Aug. 2, 1966    R. A. WATSON    3,263,944
SPACE CRAFT NAVIGATION SYSTEM
Filed July 2, 1962    2 Sheets-Sheet 1

INVENTOR
ROBERT A. WATSON
BY George J. Netter
ATTORNEY

United States Patent Office 3,263,944
Patented August 2, 1966

3,263,944
SPACE CRAFT NAVIGATION SYSTEM
Robert A. Watson, Endicott, N.Y., assignor to International Business Machines Corporation, New York, N.Y., a corporation of New York
Filed July 2, 1962, Ser. No. 206,771
2 Claims. (Cl. 244—14)

The invention relates to a space craft navigation system, and more particularly to such a system in which a gyroscopically stabilized platform is correctively supplemented by observations of celestial bodies.

A standard approach to the navigation of a craft in space is to provide a platform on the craft having gyroscopes appropriately mounted for sensing inertial changes in each of the degrees of freedom of the craft. When the craft experiences accelerations, for example, the platform provides corresponding signals representative of the change in acceleration, or more to the point, reorientation of the craft as a result of these changed accelerations. Rendering of a complete stored series of such signals provides a means for determining navigational facts relating to the craft.

The gyroscopes of the platform have an innate tendency to drift which can cumulatively produce large errors, unless some compensating or correcting measures are taken. A general solution to this problem has been to provide one or more telescopes mounted on the stabilized platform, which are continuously pointed at arbitrarily selected celestial bodies as long as the platform retains its correct orientation. However, on a change of the platform from this predisposition, the images of the celestial bodies via the telescopes and appropriate light responsive apparatus provide signals for either reorienting the platform or in some manner indicating the change effected.

Use of such a star tracking or star following apparatus physically carried by the platform, although offering substantial benefits in increased accuracy, is accompanied by several disadvantages. For example, in such an arrangement the viewing window, is of necessity, exceptionally large to accommodate the full range of possible maneuvering of the telescope(s). Also, special measures are needed to prevent obstructing of the viewing window by gimbal apparatus, where such is used. Moreover, a single enclosure for both the platform and star tracker must be proportionately larger which may be undesirable in certain types of craft having limited or special equipment space requirements.

Resultantly, optimum results are believed obtained when a gyroscopic platform is monitored by a star tracker or star follower located remotely and separately from the platform, with appropriate interrelationship between the two being accomplished by a servo system. And it is to this general class of navigation apparatus that the present invention belongs.

Further, intertial sensor packages are of either of two general types: First, a gimbaled platform, or second, what is termed a craft-oriented apparatus. As the name gimbaled implies, the spinning space stabilized element remains in a present orientation with respect to a gimbal system fixed to the craft and relative positional changes of the element to the gimbal system provide the desired navigational information. In craft-oriented (also sometimes referred to as "strap-down") inertial packages, the gyros are themselves fixed to the craft and they provide signals of corresponding character when subjected to linear and/or angular accelerations, which, on interpretation provide information as to changes in movement of the craft.

In the craft-oriented mode of operation so-called torquing of a gyro is integrated to provide a continuously comparative relation of the craft to an initial mathematical reference vector which is stored in a digital computer. Although not confined to this type of platform above, the invention is particularly applicable to use with a strap-down gyroscopic package.

It is therefore a primary object of the invention to provide a navigation system comprising an inertial sensor package and a remote stellar correcting means.

Another object is the provision of such a system in which the platform is of the non-gimbaled class affixed directly to a craft.

A further object is the provision of a navigational system comprising a stabilized platform and monitoring and correcting apparatus including several telescopes remotely mounted from the platform.

A still further object is the provision of such a navigational system in which a stellar observing correction means is provided having gyro stabilization.

The foregoing and other objects, features and advantages of the invention will be apparent from the following more particular description of preferred embodiments of the invention, as illustrated in the accompanying drawings:

Figure 1:
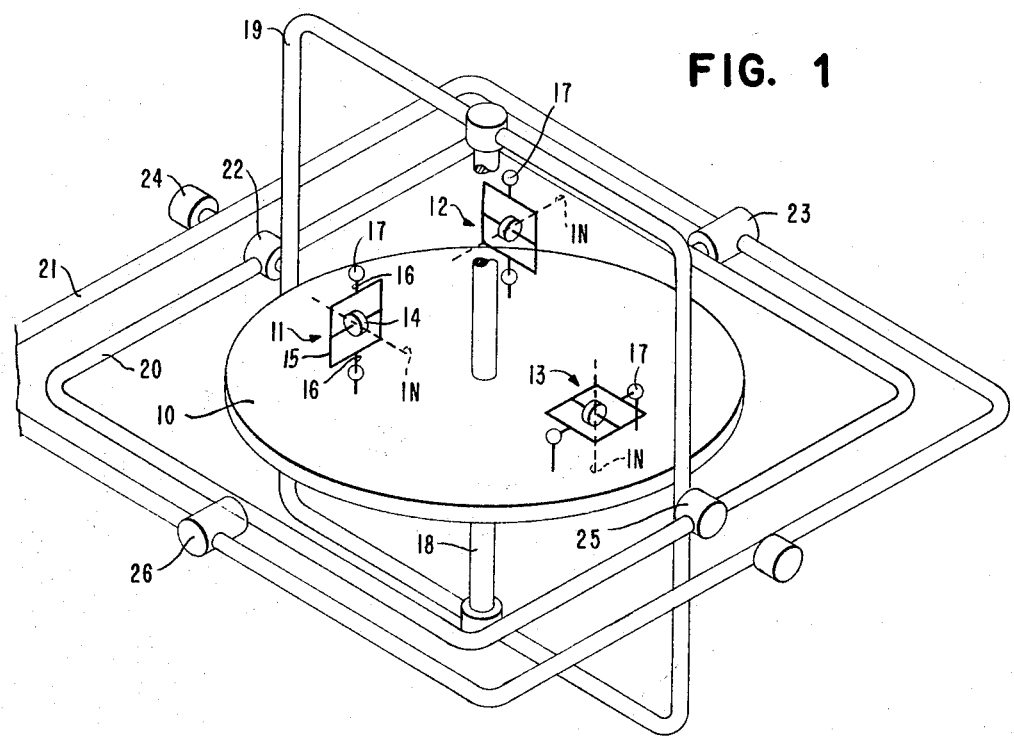
FIGURE 1 illustrates a gimbaled inertial platform serving as a basic navigational element for the invention.

With reference now to FIGURE 1, the basic navigational apparatus according to a first form of the invention is a three-degree of freedom gyro platform with gimbal mountings. A gyro base 10 includes a flat surface for receiving three (3) single-axis gyroscopes 11–13 thereon. The gyros are so arranged that their respective input directions are mutually orthogonal as indicated by the dash line, and forming what is sometimes termed a triad. Each gyroscope comprises a spinning rotor 14 received within a gimbal 15 having external shafts 16 rotatably mounted such that the gimbal and its included rotor are pivotable about an axis normal to the shaft of rotation for the rotor.

Drivingly engaged with the shaft 16 of each of the gyros 11–13 is a separate high precision angular pickoff 17. Although several conventional types of pickoffs might be satisfactory here, it is considered best that they be of a type providing signals in digital form representative, to within a high degree, the angular position of the gimbaled rotor as measured about the shaft 16.

An excellent device for use as the pickoffs 17 is an angle encoder which is the basis of a copending application, Serial No. 133,735, Analog-to-Digital Converter, by Lewis A. Knox, filed August 23, 1961, and assigned to the same assignee.

The gyro base 10 has a shaft 18 affixed to it and passing therethrough in a direction normal to the surface on which the gyros 11–13 are mounted. As described here, the base 10 and shaft 18 will be referred to as the first gimbal.

The extremities of the shaft 18 are rotatably received within a second gimbal 19 comprising generally a rectangular hoop-shaped member with the shaft 18 secured for rotation along a diameter.

Similarly, the gimbal 19 is pivotally mounted within a third gimbal 20 at points located ninety degrees from those points at which the shaft 18 is mounted. In turn, the third gimbal 20, at ninety degrees to the connections to the second gimbal, is secured for rotation to a fourth gimbal 21. Lastly, the fourth gimbal is journaled in supports affixed to the craft at points which can be brought into alignment with the journal points between the second and third gimbals.

Precision angular pickoffs 22 and 23 are furnished for sensing the angular position of the second gimbal to the third gimbal and the third gimbal to the fourth gimbal, respectively. A further angular pickoff 24 indicates angular relationship of the fourth gimbal to the craft. Each of these pickoffs 22–24 is a high precision device such as that disclosed in the above-noted copending application.

Torquers 25 and 26 provide means for selectively coercing or reorienting the second gimbal with respect to the third gimbal and the third gimbal to the fourth gimbal, respectively. These torquers are electromagnetic devices of well-known construction which can be electrically impulsed to effect movement, here angular in nature.

As to the general operation of the platform, each gyro 11–13 provides stabilization for one axis of the craft, where stabilization means monitoring changes in craft position with respect to a fixed predetermined reference line. More particularly, each gyro is responsive to input changes along those respective directions indicated by IN and output signals are provided by the pickoffs 17 corresponding to these changes. Collateral circuitry interprets these signals into useful information.

In a full three-degree of freedom system additional means are also provided for obtaining information as to changes in what is termed the azimuth direction where the two previously described angular correction capabilities would correspond to changes about the roll and pitch axes of the craft. However, for present purposes entry into details of an azimuth control system is not deemed necessary for a full understanding of the invention.

Figure 2:
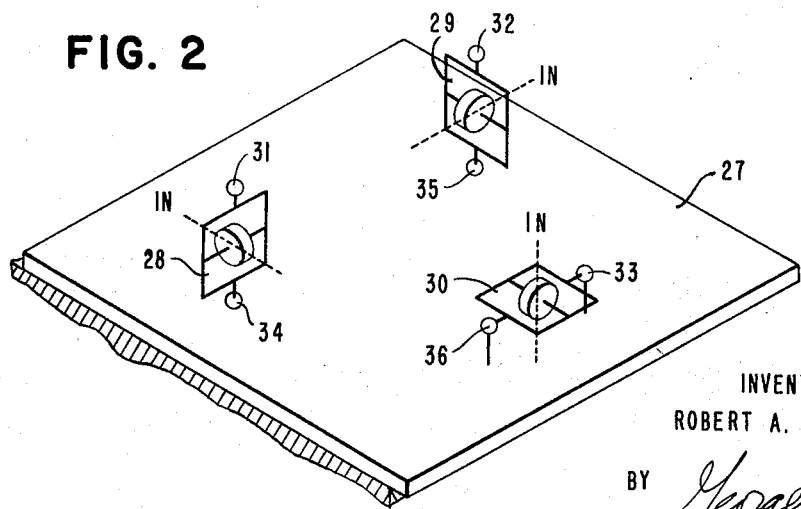
FIGURE 2 is a generalized representative of a strap-down, or craft-oriented, inertial sensor package.

FIGURE 2 illustrates a second form of inertial sensor package which is directly related to the craft rather than via a gimbaled arrangement as in FIGURE 1. Thus, as before, a base member 27 has a flat surface on which are mounted three single-axis gyroscopes 28–30 with their respective input directions arranged at ninety degrees to one another. Angular position read-out means 31–33 serve the same general function as the pickoffs 17 in providing digital signals corresponding to angular position of the rotor gimbal mounting shaft. Also, torquing means 34–36 are supplied for individually reorienting the respective gyros 28–30 in the same manner and for similar purposes as the torquers previously discussed.

Figure 3:
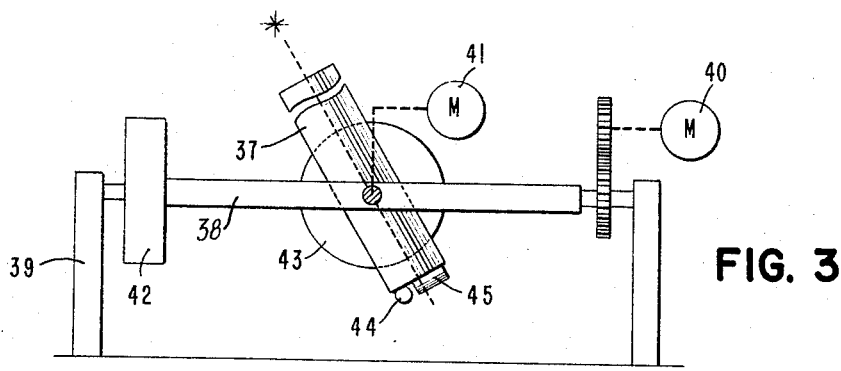
FIGURE 3 shows a star follower apparatus with self-stabilizing gyroscopic equipment.

Irrespective of which inertial sensor package is used the star tracker of FIGURE 3 provides a means for making observations of selected stars of planets and providing observational data to a computer for calculating required corrections to the platform. Essentially it comprises a telescope 37 pivotally mounted in a gimbal 38 which is rotatably mounted on pedestals 39 secured to the craft. Although not shown, the two axes of rotation of the telescope are aligned respectively, with the two axes of control of the inertial sensor package in order to make correlation of the telescope movement to package movement a simpler matter. However, any two other arbitrarily selected axes of rotation can be used as long as the relation to sensor package movement is known.

A pair of servomotors 40 and 41 are supplied to drive the telescope about its two different axes of rotation. Precision angular pickoff means 42 and 43 are similarly provided for accurately indicating the angular position of the telescope about these axes of rotation.

A pair of stabilizing gyros 44 and 45 are carried by the telescope directly. The input axes of the gyros are normal to one another and conventional pickoff and torquing means (not shown) are provided. For reasons which will become more evident the stabilizing gyros can be relatively inexpensive and far less accurate devices than the gyros 11–13 of the platform or craft oriented sensor package. This is true basically because according to the circuit relationships of the star tracker and the platform the functional characteristics of the telescope gyros do not affect the overall accuracy since they serve merely as smoothers in a closed loop.

As to the general functioning of the star tracker, the light received from a given celestial body is customarily utilized to actuate a light responsive electric signal generating means. These signals are then filtered to remove extraneous noise caused by contrails, clouds, other or dim stars, and the like. These filtered star pulses are then introduced into a computer where errors in star centering are computed and additional computations, which are of more pertinence here, are accomplished to provide a corrective influence on the inertial sensor package. This corrective information is obtained by comparing pointing angles of the telescope with stored data and generating a corresponding error signal to correct the positioning of the sensor package. Although only one star tracker is illustrated a more complete and accurate correction is obtained when two such tracking systems are utilized maintaining separate fixes on two different celestial bodies.

As is clear from the above description and discussion, a piece of apparatus essential to the proper coordinated functioning of the star tracker and interial package is a digital computer. This computer must have the capability of storing star table information and processing signal data from the tracker for generating corrective signals to reorient the platform or the inertial axes in the proper direction. There are also collateral operations assigned to the computer which will be described in the detailed discussion to follow.

Figure 4:
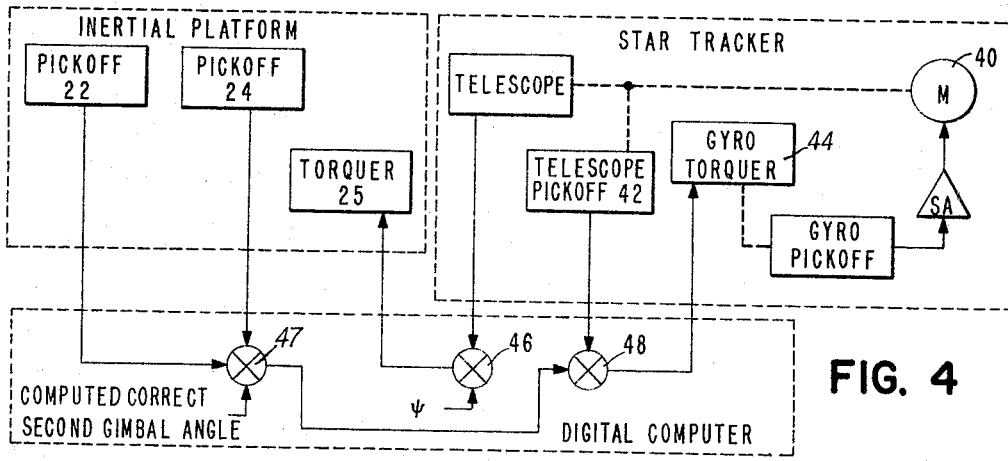
FIGURE 4 shows in generalized schematic form the servo system interrelating the star follower of FIGURE 3 and gimbaled inertial platform of FIGURE 1 in accordance with the practice of the invention.

Turning now to FIGURE 4, there is illustrated in block form the circuit aspects of the servo system relating the inertial package to the star following apparatus which collectively form a first embodiment of the invention. For ease of presentation, only that part of the invention concerned with changes in angular position of the second gimbal relative to the third gimbal will be described, it being understood that separate identical systems are required for determinations about the other axes of rotation.

Assume that the pointing angle of the telescope is incorrect, and thus that the scope is not picking up light from the appropriate star. The signal from the optical star sensing apparatus is mixed in the means 46 with resolution information stored in the computer for converting the telescope coordinates to the coordinates of the inertial package. The latter information is indicated by the symbol $\psi$. The output of the means 46 serves to energize the torquer 25 and effect repositioning of the second gimbal 19 with respect to the third gimbal 20. The signals provided by the pickoffs 22 and 24 are mixed in the means 47 with the computer correct second gimbal angle obtained from the star tables carried by the computer. It is to be noted that the pickoff 24 is redundant in a navigational sense and merely maintained the fourth gimbal 21 at a fixed predetermined attitude to the craft which customarily is ninety degrees.

The resultant signal from the means 47 represents the desired telescope pointing angle which is subtracted in a means 48 from the telescope pickoff 42 information. The difference signal from the means 48 actuates the torquer of the telescope stabilizing gyro 44, for example, which in turn drives through the pickoff for the same drives a servo amplifier (SA) energizing the servomotor 40. Rotation of the motor 40 is in such direction as to center the telescope on the given star and to set the star tracker pickoff 42 at such a value as would nullify the input to means 48 from the mixing means 47. Adjustments, or corrections, are processed by the above-described servo system such that an equilibrium condition is maintained. When this is achieved the telescope is pointing in the correct direction as determined by the stored star table information and the inertial axes are corrected to correspond to the pointing condition of the telescope thereby achieving the desired object of the invention.

From the foregoing discussion it is clear that the accuracy of positioning the inertial platform is determined by the platform components and the telescope pickoffs, and that any drift which may exist in the star tracker gyros 44–45 does not affect the accuracy since the gyros are only present here in what is termed a "smoother" servo capacity.

Figure 5:
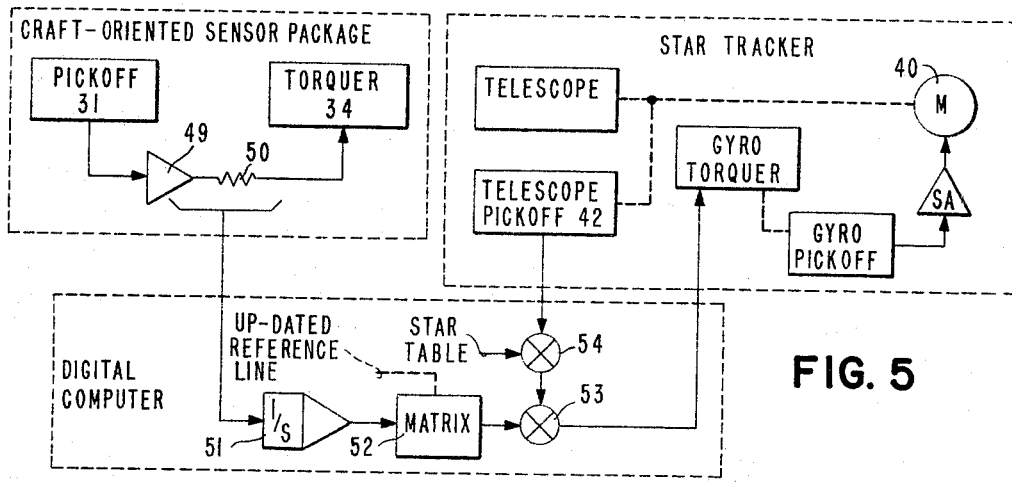
FIGURE 5 is a schematic of the invention as practiced with the craft oriented package of FIGURE 2.

Reference should now be made to FIGURE 5 illustrating a further form of the invention in which a craft-oriented, or strap-down, inertial sensor package is the basic navigational device. With respect to the sensor package, the pickoff of each of the gyros 28–30 is connected to drive its respective torquer. More particularly as shown for the gyro 28, the signal provided by the pickoff 31 is fed into an amplifier 49 for providing torquing current through a resistance 50 to energize the torquer 34. The effect of this arrangement is to maintain the orientation of the gyro at a constant attitude relative to the base member 27, and thus also to the craft.

It should be noted that in the strap-down configuration the torquing current, and accordingly the voltage seen across the resistance 50, is proportional to the torque producing the corresponding change in gyro and reflected in a signal from the pickoff 31. On feeding the voltage appearing across the resistance 50 into an integrating means 51 an output signal is obtained which is indicative of the new position as a result of the last torque acting on the craft and sensor package. This last signal is then introduced into a matrix 52 for further interpretive transformation output of which is added to a mixing means 53.

Star table information as to the correct pointing angle for the particular celestial body being observed is added to a second mixing means 54 along with the signal product of the telescope pickoff 42. The resultant from the means 54 is added, with the signal from the matrix, to the mixing means 53. Further, the resultant signal from the means 53 is presented to the gyro torquer for driving the servomotor 40 via the gyro pickoff and amplifier (SA), as before. The servomotor powers the telescope and its pickoff 42 to a different angular position corresponding to the character of the signal from the means 53.

It is important to a complete understanding of the invention to note the basic difference between the two described embodiments. First of all with the gimbaled platform the platform is reoriented to agree with the star tracker correction data; whereas in the case of a craft-oriented sensor package it is not repositioned in this manner, but rather maintained at a fixed relation to the craft by the self-torquing scheme already described. Thus, in the latter case instead of reorienting the inertial package, positional changes are provided as stored data which is continuously updated via a reference frame stored initially in the computer.

A navigational system constructed in accordance with the principles of the present invention is possessed of several important and advantageous features. First of all, gyro stabilization of the star tracker, or more particularly the telescope 37, minimizes the effect of craft motion and fixes the pointing angle of the telescope regardless of jitter, vibrations and/or other disturbances of either the star tracker or the inertial sensor package.

A further advantage is that the invention makes the use of a plurality of telescopes for sighting on an equal number of celestial bodies, a completely feasible matter. Specifically, the problems of excessive viewing window, large total package enclosure, among others, are obviated here by the remote and separate mounting capability of each telescope and associated gyro stabilizing apparatus.

Additionally, as is explicit from the described embodiments, the invention has equal applicability to either a gimbaled platform or a craft-oriented inertial element arrangement thereby providing greater flexibility in adapting the invention to a given craft and particular set of navigational requirements.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A craft guidance system comprising in combination a craft-oriented sensor package having single-axis gyroscopic first means directly mounted to said craft for monitoring angular changes in craft position with respect to a predetermined inertial reference frame, said gyroscopic first means having a predetermined orientation with respect to said reference frame when said angular changes are absent, angle pick-off first means associated with said gyroscopic first means for providing a first output signal proportional to said angular changes, and torquing first means associated with said gyroscopic means and responsive to said first output signal to reorient said gyroscopic first means to said predetermined orientation, a gyroscopically stabilized optical tracker for determining the direction of a preselected celestial body with respect to said craft, said optical tracker having telescope means for observing said preselected celestial body, light responsive signal generating means for providing a second output signal proportional to the position of said observed body with respect to the optical viewing center of said telescope means, said second signal being utilized to supplement the navigational information of said system, multiple-axis tracker mounting means affixed to said craft at a location remote from said sensor package and adapted to carry said telescope means for rotation about each of the multiple axes of said mounting means, said axes being aligned in a preselected relationship with the axes of said reference frame to provide a predetermined correlation between the movement of said telescope means and said sensor package, respectively, angle pick-off second means associated with said mounting means for providing a third output signal proportional to the indicated pointing angle of the telescope means with respect to the craft, a gyro stabilizer for stabilizing said telescope means, said gyro stabilizer having gyroscopic second means, torquing second means for torquing said gyroscopic second means, and angle pick-off third means for providing a fourth output signal proportional to the torque induced in said gyroscopic second means by said torquing second means, and servo means responsive to said fourth output signal for driving said telescope means about the axes of said multiple-axis tracker mounting means, and a computer for determining the position of said craft with respect to said inertial reference frame, said computer comprising matrix means having stored therein information representing said inertial reference frame, and integrating means coupled to said matrix means for integrating said first output signal with the information contained in said matrix means, said matrix means providing a fifth output signal representing the computed angle of said craft with respect to said inertial reference frame, said computer further comprising first mixer means for adding said third output signal with star-table information pertaining to the preselected celestial body being tracked to provide a sixth output signal representing the indicated angle of said craft with respect to said inertial reference frame, and a second mixer means for comparing said fifth and sixth output signals to provide an error signal whenever there is a difference between said fifth and sixth output signals, said torquing second means being responsive to said error signal to torque said gyroscopic second means and provide said fourth output signal in said angle pick-off third means, said servo means in response to said fourth signal driving said telescope means about the axes of said multiple-axis tracker to null said error signal and align the optical viewing center of said telescope means with said observed body.

2. A craft guidance system according to claim 1 wherein said second output signal is utilized to up-date the inertial reference frame information contained in said matrix means.

References Cited by the Examiner

UNITED STATES PATENTS

| | | | |
|---|---|---|---|
| 2,707,400 | 5/1955 | Manger | 74—5.4 |
| 2,894,396 | 7/1959 | Jofeh | 74—5.37 |
| 2,949,030 | 8/1960 | Horsfall et al. | 244—14.4 |
| 2,949,785 | 8/1960 | Singleton | 74—5.34 |
| 2,963,243 | 12/1960 | Rothe | 244—14 |
| 2,995,318 | 8/1961 | Cocharo | 244—14 |
| 3,008,668 | 11/1961 | Darlington | 244—14 |
| 3,037,289 | 6/1962 | Garbarini et al. | 250—203 |
| 3,048,352 | 8/1962 | Hansen | 244—14 |
| 3,131,292 | 4/1964 | Tobin et al. | 244—14 X |

OTHER REFERENCES

Horsfall, Aviation Week, March 17, 1958, pp. 73, 75, 76 and 79.

P. J. Klass, "Inertial Guidance" received in Patent Office April 25, 1957, pp. 18 and 19 relied on.

BENJAMIN A. BORCHELT, *Primary Examiner.*

SAMUEL W. ENGLE, SAMUEL FEINBERG,
*Examiners.*

T. A. ROBINSON, M. F. HUBLER, *Assistant Examiners.*